(12) United States Patent
Wallace

(10) Patent No.: US 11,738,595 B2
(45) Date of Patent: Aug. 29, 2023

(54) VEHICLE WHEELS, METHODS OF MAKING VEHICLE WHEELS, AND DUAL WHEEL ASSEMBLIES

(71) Applicant: HOWMET AEROSPACE INC., Pittsburgh, PA (US)

(72) Inventor: Spencer Wallace, Cleveland, OH (US)

(73) Assignee: HOWMET AEROSPACE INC., Pittsburgh, PA (US)

(*) Notice: Subject to any disclaimer, the term of this patent is extended or adjusted under 35 U.S.C. 154(b) by 671 days.

(21) Appl. No.: 16/801,389

(22) Filed: Feb. 26, 2020

(65) Prior Publication Data

US 2020/0369075 A1    Nov. 26, 2020

Related U.S. Application Data

(60) Provisional application No. 62/852,496, filed on May 24, 2019.

(51) Int. Cl.
*B60B 3/00* (2006.01)
*B60B 3/02* (2006.01)

(52) U.S. Cl.
CPC .............. *B60B 3/004* (2013.01); *B60B 3/002* (2013.01); *B60B 3/02* (2013.01)

(58) Field of Classification Search
CPC ......... B60B 3/002; B60B 3/004; B60B 3/005; B60B 3/008; B60B 3/02
See application file for complete search history.

(56) References Cited

U.S. PATENT DOCUMENTS

| | | | |
|---|---|---|---|
| 5,435,633 A | 7/1995 | Jaskierny | |
| 5,544,945 A | 8/1996 | Daudi | |
| 5,569,496 A * | 10/1996 | Wei | B60B 3/02 |
| | | | 427/455 |
| 6,070,946 A | 6/2000 | Holmes | |

(Continued)

FOREIGN PATENT DOCUMENTS

| | | |
|---|---|---|
| DE | 9419359 U1 | 2/1995 |
| DE | 19957255 A1 | 6/2001 |

(Continued)

OTHER PUBLICATIONS

International Search Report and Written Opinion of the International Searching Authority for International Application No. PCT/US2020/019799 dated Jun. 23, 2020.

*Primary Examiner* — Jason R Bellinger
(74) *Attorney, Agent, or Firm* — K&L Gates LLP

(57) ABSTRACT

Vehicle wheels, methods of making vehicle wheels, and dual wheel assemblies are provided. The vehicle wheel includes a generally cylindrical first region and a second region extending radially inwardly from the first region. The second region includes a first surface, a second surface, an opening, and a hub surface. A distance from the first surface to the second surface defines a thickness. The opening is configured to receive at least a portion of a hub of the vehicle axle. The hub surface is adjacent to and surrounds the opening and extends from the first surface to the second surface. The hub surface includes a generally flat portion and a relief portion adjacent to at least one of the first surface and the second surface. The relief portion surrounds the opening and extends along the hub surface for a distance of at least 25% of the thickness.

20 Claims, 7 Drawing Sheets

(56) References Cited

U.S. PATENT DOCUMENTS

| | | | | |
|---|---|---|---|---|
| 6,158,820 A | * | 12/2000 | Archibald | B60B 1/08 |
| | | | | 29/894.32 |
| 6,641,224 B1 | | 11/2003 | Heck et al. | |
| 7,416,260 B1 | * | 8/2008 | Cuevas | B60B 7/08 |
| | | | | 301/37.11 |
| 9,194,766 B2 | * | 11/2015 | Fitzpatrick, Jr. | G01M 17/013 |
| 2006/0125311 A1 | | 6/2006 | Bruce et al. | |
| 2007/0267914 A1 | | 11/2007 | Verdun et al. | |

FOREIGN PATENT DOCUMENTS

| | | | | |
|---|---|---|---|---|
| DE | 102017002581 B3 | 4/2018 | | |
| EP | 3177465 B1 | 1/2022 | | |
| JP | 58-19041 Y2 | 4/1983 | | |
| JP | 2003-516893 A | 5/2003 | | |
| JP | 2009-518213 A | 5/2009 | | |
| JP | 2009-274468 A | 11/2009 | | |
| WO | 01/43991 A | 6/2001 | | |
| WO | 2020086090 A1 | 4/2020 | | |
| WO | WO-2021118984 A1 * | 6/2021 | | B60B 21/106 |
| WO | WO-2021154340 A1 * | 8/2021 | | B60B 3/004 |

\* cited by examiner

VEHICLE WHEELS, METHODS OF MAKING VEHICLE WHEELS, AND DUAL WHEEL ASSEMBLIES

CROSS-REFERENCE

This application claims priority to U.S. Provisional Patent Application No. 62/852,496, which was filed on May 24, 2019. The contents of which is incorporated by reference into this specification.

FIELD OF USE

The present disclosure relates to vehicle wheels, methods of making vehicle wheels, and dual wheel assemblies.

BACKGROUND

Medium-duty vehicles and heavy-duty vehicles, such as semi-trucks, can carry loads in excess of 10 tons. The vehicle's wheels distribute the weight of these loads to the ground. Designing a vehicle wheel to efficiently distribute these loads presents challenges.

SUMMARY

In one aspect, a vehicle wheel is provided. More specifically, the vehicle wheel comprises a generally cylindrical first region and a second region. The first region comprises an outer surface and an inner surface. The second region extends radially inwardly from the first region. The second region is configured to mount to a vehicle axle. The second region comprises a first surface, a second surface, an opening, and a hub surface. A distance from the first surface to the second surface defines a thickness. The opening extends from the first surface to the second surface and is configured to receive at least a portion of a hub of the vehicle axle. The hub surface is adjacent to and surrounds the opening and extends from the first surface to the second surface. The hub surface comprises a generally flat portion and a relief portion adjacent to at least one of the first surface and the second surface. The relief portion surrounds the opening and extends along the hub surface for a distance of at least 25% of the thickness.

In another aspect, a dual wheel assembly comprising a first vehicle wheel and a second vehicle wheel is provided. Each of the first vehicle wheel and the second vehicle wheel comprises a generally cylindrical first region and a second region. The first region comprises an outer surface and an inner surface. The second region extends radially inwardly from the first region. The second region is configured to mount to a vehicle axle. The second region comprises a first surface, a second surface, an opening, and a hub surface. A distance from the first surface to the second surface defines a thickness. The opening extends from the first surface to the second surface and is configured to receive at least a portion of a hub of the vehicle axle. The hub surface is adjacent to and surrounds the opening and extends from the first surface to the second surface. The hub surface comprises a generally flat portion and a relief portion adjacent to the second surface. The relief portion surrounds the opening and extends along the hub surface for a distance of at least 25% of the thickness. The first surface of the first vehicle wheel is adjacent to the first surface of the second vehicle wheel. A central axis of the opening of the first vehicle wheel and a central axis of the opening of the second vehicle wheel are coaxial.

In yet another aspect, a method of making a vehicle wheel is provided. The method comprises providing a vehicle wheel by a method comprising at least one of forming, curing, forging, casting, and additive manufacturing, the vehicle wheel comprising at least one of metal and a metal alloy. The vehicle wheel comprises a generally cylindrical first region and a second region. The first region comprises an outer surface and an inner surface. The second region extends radially inwardly from the first region. The second region is configured to mount to a vehicle axle. The second region comprises a first surface, a second surface, an opening, and a hub surface. A distance from the first surface to the second surface defines a thickness. The opening extends from the first surface to the second surface and is configured to receive at least a portion of a hub of the vehicle axle. The hub surface is adjacent to and surrounds the opening and extends from the first surface to the second surface. The hub surface comprises a generally flat portion and a relief portion adjacent to at least one of the first surface and the second surface. The relief portion surrounds the opening and extends along the hub surface for a distance of at least 25% of the thickness.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain non-limiting embodiments, in one form, and such exemplifications are not to be construed as limiting the scope of the appended claims in any manner.

DETAILED DESCRIPTION

Figure 1A:
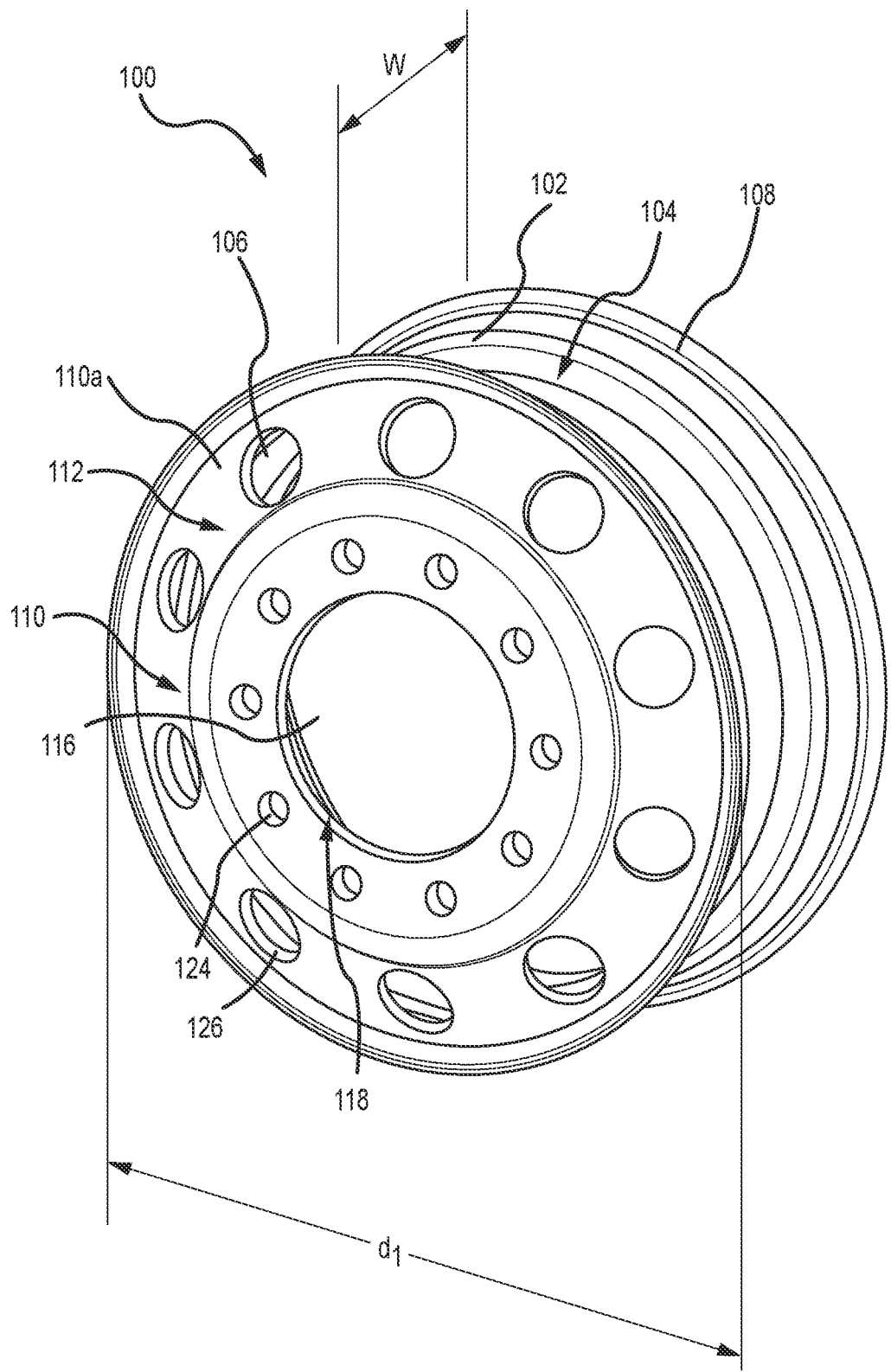
FIG. 1A is a front perspective view of a non-limiting embodiment of a vehicle wheel according to the present disclosure.

Various examples are described and illustrated herein to provide an overall understanding of the structure, function, and use of the disclosed articles and methods. The various examples described and illustrated herein are non-limiting and non-exhaustive. Thus, an invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various non-limiting embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be immediately adjacent to or in contact with the first and/or second elements, and other elements may be disposed between the referenced element and the first and/or second elements.

Engagement between a hub surface of a vehicle wheel and a hub of a vehicle axle can facilitate the alignment of the vehicle wheel and the vehicle axle. However, too much engagement can cause the vehicle wheel to bind on the hub and can make the vehicle wheel difficult to install, remove, and/or service. According to the present disclosure, a vehicle wheel is provided that can comprise a hub surface that can provide a desired degree of engagement with the hub of the vehicle axle in order to facilitate efficient installation, removal, and/or service of the vehicle wheel.

Additionally, a sturdy vehicle wheel is heavy which can increase fuel costs while operating the vehicle. According to the present disclosure, a vehicle wheel is provided which can comprise a sturdy structure suitable to support a load carried by the vehicle and which also has a decreased mass relative to certain conventional vehicle wheels. The decreased mass can result in fuel savings while operating the vehicle. The vehicle wheel may comprise a reduced weight and the hub surface configured to enable alignment of the vehicle wheel with a hub of the vehicle.

Figure 1B:
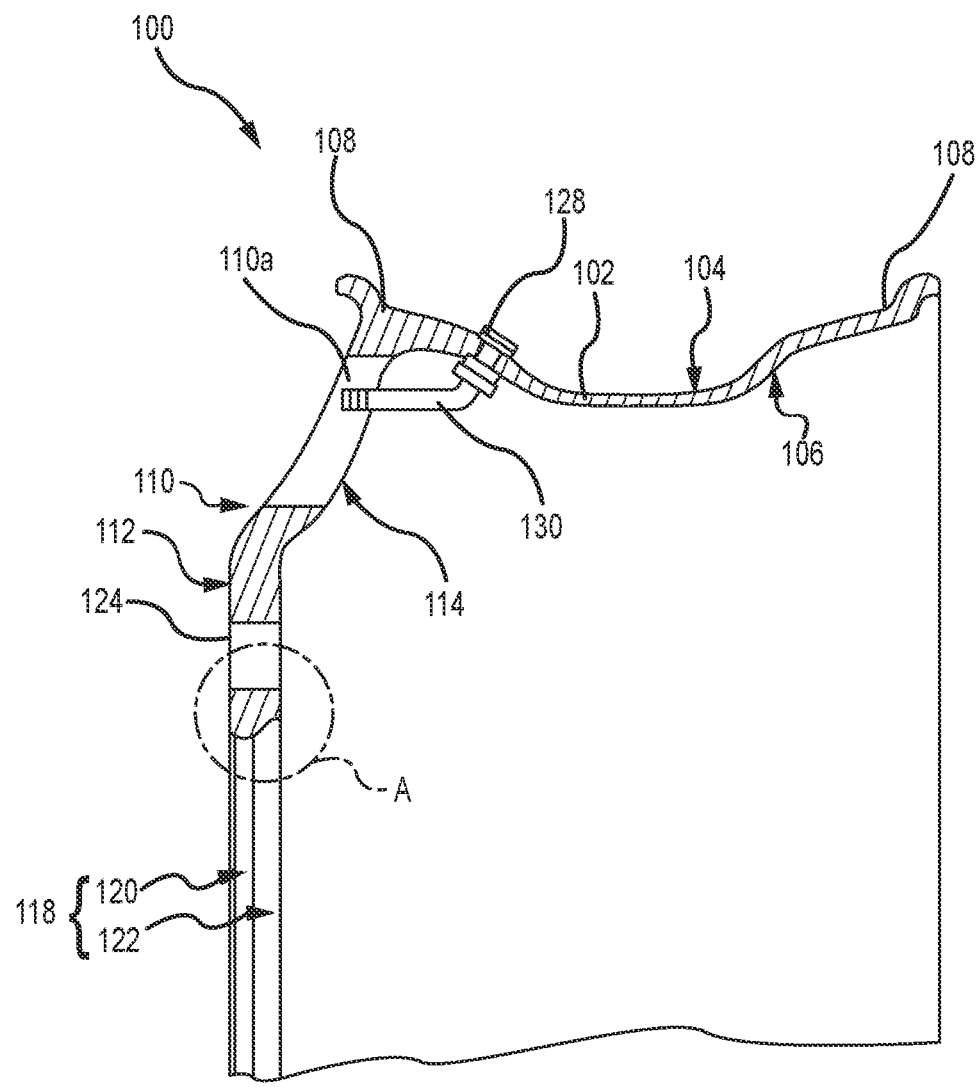
FIG. 1B is a cross-sectional detail view of a portion of the vehicle wheel of FIG. 1A.
Figure 1C:
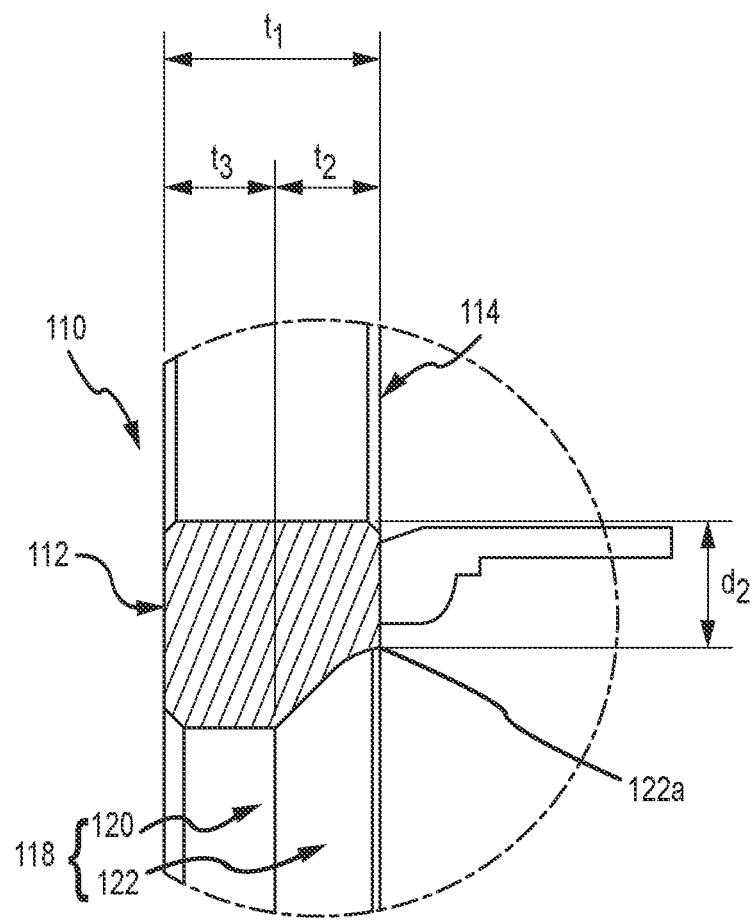
FIG. 1C is a detail view of area A of FIG. 1B.

As illustrated in FIGS. 1A-C, a vehicle wheel 100 is provided. The vehicle wheel 100 comprises a first region 102 and a second region 110. The first region 102 is generally cylindrical and comprises an outer surface 104 and an inner surface 106. The outer surface 104 can comprise a tire mount 108 which can be disposed about a circumference of the outer surface 104 of the first region 102. The tire mount 108 can be configured so that a tire can be mounted thereon. For example, the tire mount 108 can, as shown, comprise a tire bead set configured to receive a tire. The tire can comprise any suitable dimensions for mounting on the tire mount 108. For example, depending on the dimensions of the tire mount 108, the tire can comprise dimensions selected from 11R22.5, 295/75R22.5, 11R24.5, and 285/75R24.5.

The first region 102 can comprise a nominal rim width and a nominal rim diameter adapted to receive a tire. In various non-limiting embodiments, the first region 102 can comprise a nominal rim width, w, in a range of 1 inch (2.54 mm) to 100 inches (2540 mm), such as, for example, 6 inches (152.4 mm) to 12 inches (304.8 mm). For example, and without limitation, in certain non-limiting embodiments the nominal rim width, w, of the first region 102 can be 8.25 inches (209.6 mm) or 11 inches (279.4 mm). In various non-limiting embodiments, the first region 102 can comprise a nominal rim diameter, $d_1$, in a range of 1 inch (2.54 mm) to 200 inches (5080 mm), such as, for example, 14 inches (406.4 mm) to 25 inches (635 mm). For example, and without limitation, in certain non-limiting embodiment the nominal rim diameter, $d_1$, of the first region 102 can be 22.5 inches (571.5 mm) or 24.5 inches (622.3 mm).

In various non-limiting embodiments, the first region 102 can comprise a first valve stem mount 128. The valve stem mount 128 can be configured to receive a valve stem 130 in order to control gas transport into and out of a tire mounted on the tire mount 108.

The second region 110 can be integral with and can extend radially inwardly from the first region 102. In certain non-limiting embodiments, the second region 110 is integral with and extends radially inwardly from the inner surface 106 of the first region 102. In various non-limiting embodiments, the second region 110 extends in a direction that is substantially perpendicular to the inner surface 106 of the first region 102. The second region 110 can comprise a first surface 112, a second surface 114, an opening 116 extending from the first surface 112 to the second surface 114, and a hub surface 118 adjacent to and surrounding the opening 116 and extending from the first surface 112 to the second surface 114.

As best shown in FIG. 1C, a distance from the first surface 112 to the second surface 114 can define a thickness, $t_1$, of the second region 110. The thickness, $t_1$, can be at least 0.1 inch, such as, for example, at least 0.2 inch, at least 1 inch, or at least 2 inches. The thickness, $t_1$, can be 5 inches or less, such as, for example, 2 inches or less, 1 inch or less, or 0.2 inch or less. For example, the thickness, $t_1$, can be in a range of 0.1 inches to 5 inches.

The second region 110 is configured to mount to a vehicle axle (not shown). For example, the opening 116 can be configured to receive at least a portion of a hub of the vehicle axle. Additionally, the hub surface 118 of the second region 110 can be configured to engage the hub of the vehicle axle and facilitate alignment of the vehicle wheel 100 with the hub of the vehicle axle. In various non-limiting embodiments, the hub surface 118 can be a pilot bore suitable to engage a pilot tab of the hub of the vehicle axle.

Figure 3:
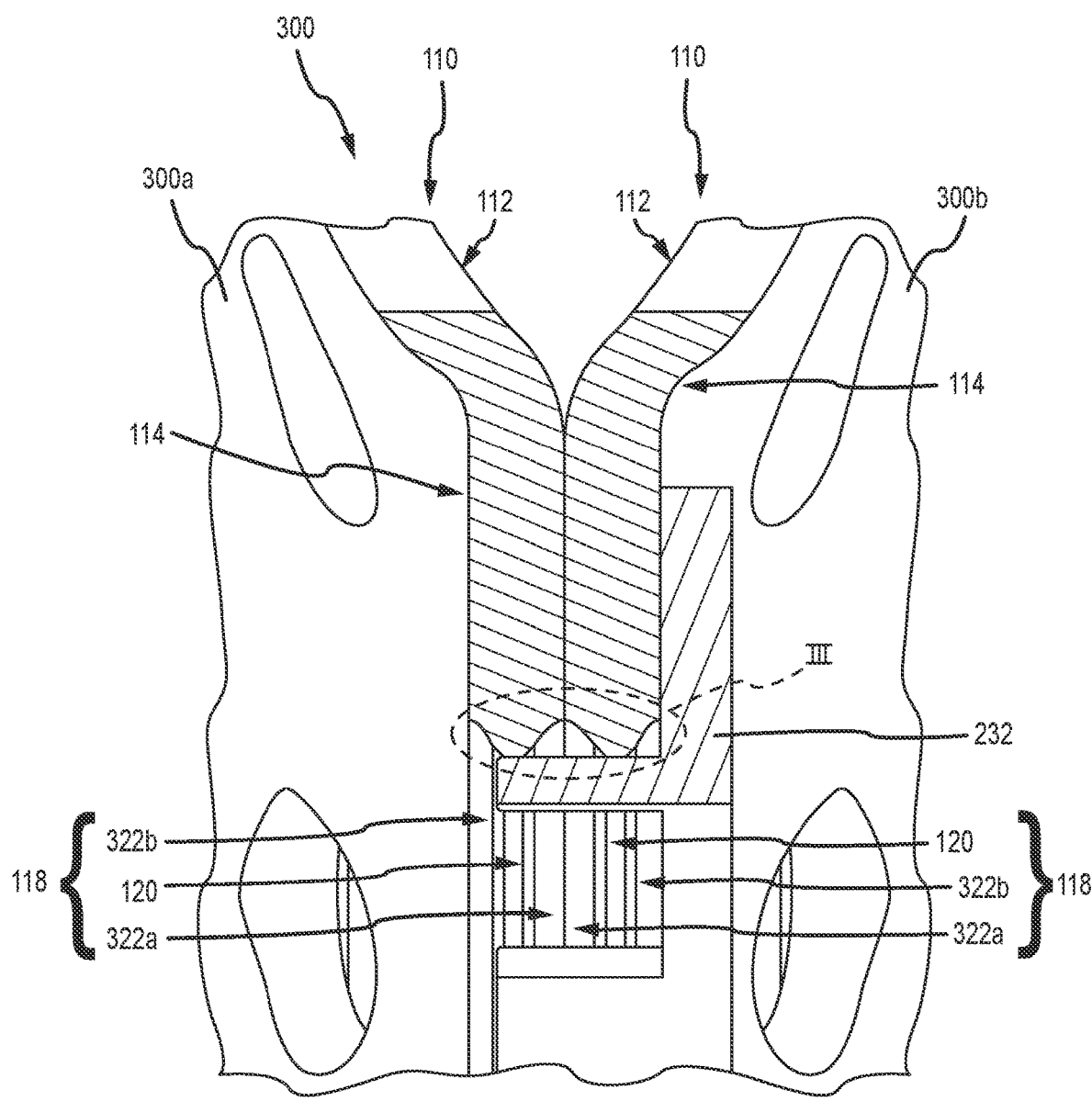
FIG. 3 is a cross-sectional detail view of a portion of a dual wheel assembly comprising relief portions with two segments according to the present disclosure.
Figure 4:
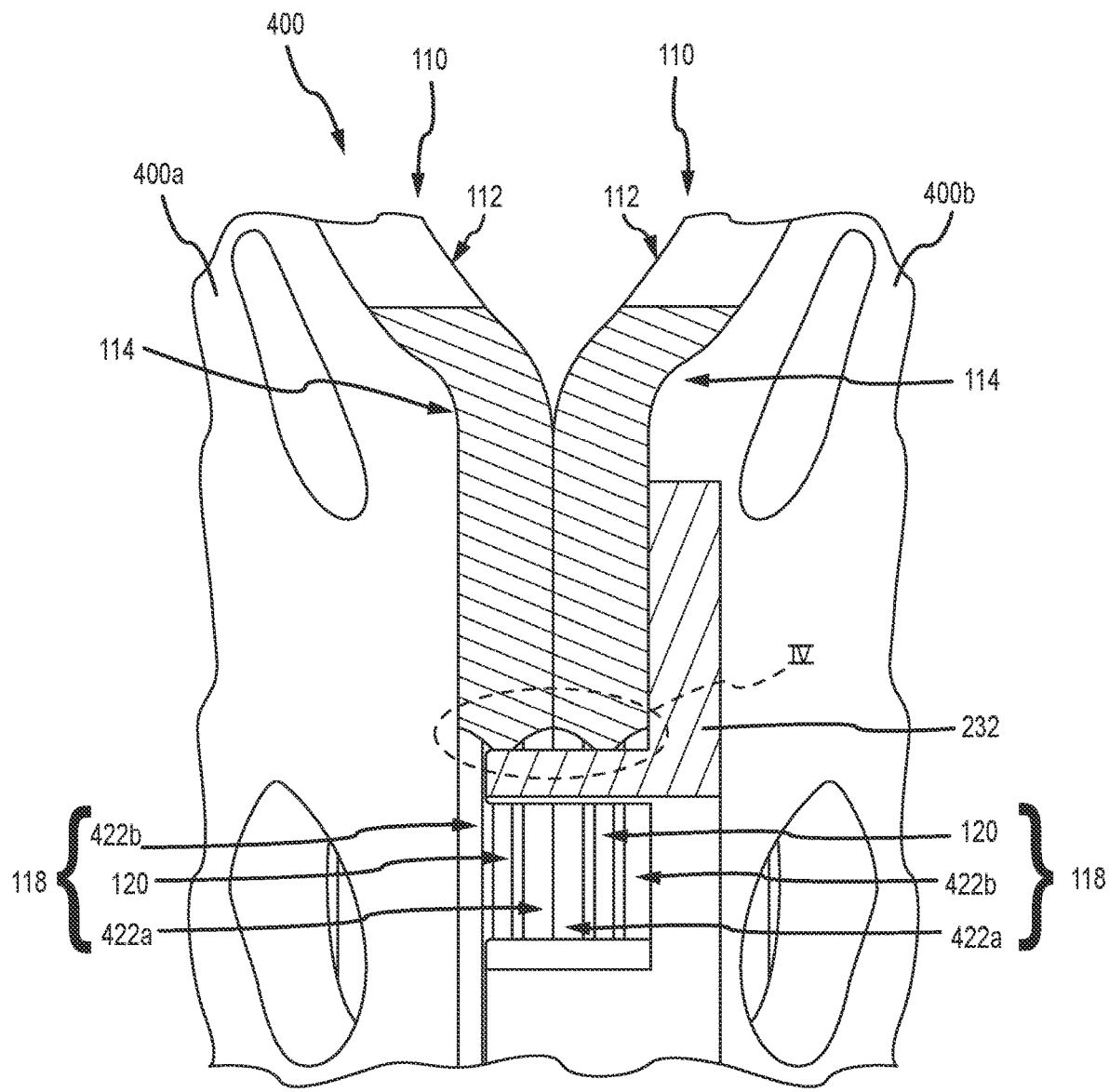
FIG. 4 is a cross-sectional detail view of a portion of a dual wheel assembly comprising relief portions with two segments in a different configuration according to the present disclosure.

The hub surface 118 can comprise a generally flat portion 120 and a relief portion 122 adjacent to at least one of the first surface 112 and the second surface 114. As illustrated in FIG. 1C, the relief portion 122 is adjacent to the second surface 114, and the generally flat portion 120 is adjacent to the first surface 112. The generally flat portion 120 can engage the hub of the vehicle wheel and facilitate the alignment of the vehicle wheel 100 with the vehicle axle. The relief portion 122 can reduce engagement between the hub of the vehicle wheel and the hub surface 118. For example, the relief portion 122 can be configured to minimally, if at all, contact the hub of the vehicle wheel. Thus, the size of the relief portion 122 relative to the generally flat portion 120 can affect the engagement between the hub surface 118 and the hub of the vehicle wheel. Accordingly, the engagement of the hub surface 118 and the hub of the vehicle wheel can be configured based on the size of the relief portion 122. In various non-limiting embodiments, the relief portion 122 can comprise two segments as illustrated in FIGS. 3 and 4 herein.

Additionally, referring back to FIG. 1C, the size and configuration of the relief portion 122 can affect the mass of the vehicle wheel. Thus, the weight of the vehicle wheel can be lowered by increasing the size of the relief portion 122. However, it may be desired to limit the relief portion 122 to minimally load bearing portions of the second region 110 in order to achieve a desired load rating of the vehicle wheel 100.

The relief portion 122 can surround the opening 116 and extend along the hub surface 118 for a distance, $t_2$, of at least 25% of the thickness, $t_1$, such as, for example, at least 30% of the thickness, $t_1$, at least 35% of the thickness, $t_1$, at least 40% of the thickness, $t_1$, at least 45% of the thickness, $t_1$, at least 50% of the thickness, $t_1$, at least 55% of the thickness, $t_1$, or at least 60% of the thickness, $t_1$. The relief portion 122 can extend along the hub surface 118 for a distance, $t_2$, of 75% or less of the thickness, $t_1$, such as, for example, 60% or less of the thickness, $t_1$, 55% or less of the thickness, $t_1$, 50% or less of the thickness, $t_1$, 45% or less of the thickness, $t_1$, 40% or less of the thickness, $t_1$, 35% or less of the thickness, $t_1$, or 30% or less of the thickness, $t_1$. For example, the relief portion 122 can extend along the hub surface 118 for a distance, $t_2$, in a range of 25% to 75% of the thickness, $t_1$, such as, for example, 30% to 60% of the thickness, or 35% to 75% of the thickness, $t_1$.

The relief portion 122 can comprise a fillet and/or a chamfer. In non-limiting embodiments where the relief portion comprises a chamfer, a chamfer length of the chamfer can be at least 0.05 inch (1.27 mm), such as, for example, at least 0.075 inch (1.9 mm), at least 0.1 inch (2.54 mm), at least 0.2 inch (5.08 mm), at least 1 inch (25.4 mm), or at least 2 inches (50.8 mm). The chamfer length can be 5 inches (127 mm) or less, such as, for example, 2 inches (50.8 mm) or less, 1 inch (25.4 mm) or less, 0.2 inch (5.08 mm) or less, 0.1 inch (2.54 mm) or less, or 0.75 inch (1.9 mm) or less. For example, the chamfer length can be in a range of 0.05 inch (1.27 mm) to 5 inches (127 mm), such as, for example, 0.1 inch (2.54 mm) to 5 inches (127 mm) or 0.075 inch (1.9 mm) to 0.2 inch (5.08 mm). In non-limiting embodiments where the relief portion comprises a fillet, a radius of the fillet can be at least 0.1 inch (2.54 mm), such as, for example, at least 0.2 inch (5.08 mm), at least 1 inch (25.4 mm), or at least 2 inches (50.8 mm). The radius can be 10 inches (254 mm) or less, such as, for example, 2 inches (50.8 mm) or less, 1 inch (25.4 mm) or less, or 0.2 inch (5.08 mm) or less. For example, the radius can be in a range of 0.1 inch (2.54 mm) to 10 inches (127 mm).

The generally flat portion 120 can surround the opening 116. The relief portion 122 can be sized such that the generally flat portion 120 extends along the hub surface 118 for a distance, $t_3$, of at least 0.01 inch (0.254 mm), such as, for example, at least 0.02 inch (0.508 mm), at least 0.1 inch (2.54 mm), at least 0.2 inch (5.08 mm), at least 0.3 inch (7.62 mm), at least 0.5 inch (12.7 mm), or at least 1 inch (25.4 mm). The relief portion 122 can be sized such that the generally flat portion 120 extends along the hub surface 118 for a distance, $t_3$, of 2 inches (50.8 mm) or less, such as, for example, 1 inch (25.4 mm) or less, 0.5 inch (12.7 mm) or less, 0.3 inch (7.62 mm) or less, 0.2 inch (5.08 mm) or less, 0.1 inch (2.54 mm) or less, or 0.02 inch (0.508 mm) or less. For example, the relief portion 122 can be sized such that the generally flat portion 120 extends along the hub surface 118 for a distance, $t_3$, in a range of 0.01 inch (0.254 mm) to 2 inches (50.8 mm) such as, for example, 0.02 inch (0.508 mm) to 1 inch (25.4 mm), or 0.1 inch (0.254 mm) to 0.3 inch (7.62 mm).

In various non-limiting embodiments, the second region 110 can comprise at least two bores 124 extending from the first surface 112 to the second surface 114. Each of the at least two bores 124 can be configured to receive a stud on a hub of a vehicle axle. Center points of each of bores 124 can be disposed evenly about a mounting circle. In various non-limiting embodiments, the mounting circle has a center common with the second region 110. In various non-limiting embodiments, the mounting circle can comprise a diameter in a range of 1 inch (25.4 mm) to 15 inches (381 mm). For example, the mounting circle can comprise a diameter, $d_2$, of 11.25 inches (285.75 mm). In various non-limiting embodiments, each bore 124 can have a diameter in a range of 0.1 inches (2.54 mm) to 2 inches (50.8 mm). For example, each bore 124 can have a diameter of 1.023 inches (26 mm). In various non-limiting embodiments, the second region 110 can comprise 10 bores 124.

The relief portion 122 can comprise an end 122a adjacent to at least one of the first surface 112 and the second surface 114. As illustrated in FIG. 1C, the end 122a is adjacent to the second surface 114. The end 122a can be disposed a distance, $d_2$, of at least 0.1 inch (2.54 mm) from each of the at least two bores 124, such as, for example, at least 0.2 inch (5.08 mm), at least 0.5 inch (12.7 mm), at least 1 inch (25.4 mm), or at least 2 inches (50.8 mm) from each of the at least two bores 124. The distance, $d_2$, can ensure a flange can be seated flush on the adjacent surface, 112, 114. For example, the flange can be a flanged nut.

The second region 110 can comprise at least two peripheral openings 126 disposed about a periphery 110a of the second region 110 and proximal to the first region 102. The at least two openings 126 can reduce a weight of the vehicle wheel 100. In various non-limiting embodiments, the second region 110 can comprise 10 openings 126. In various non-limiting embodiments, the openings 126 can be disposed about the second region 110 offset from the bores 124, as illustrated in FIGS. 1A-C, or can be disposed about the second region 110 substantially in line with the bores 124 (not shown). An offset disposition of the bores 124 and the openings 126, such as is shown in FIGS. 1A-C, can increase a load rating of the vehicle wheel 100. In various non-limiting embodiments, each opening 126 can be disposed evenly about a peripheral circle. In various non-limiting embodiments, the peripheral circle has a center common with the second region 110. The peripheral circle can comprise a diameter in a range of 2 inches (50.8 mm) to 22 inches (558.8 mm). For example, the peripheral circle can comprise a diameter of 17.3 inches (439.42 mm).

In various non-limiting embodiments, the vehicle wheel can comprise a metal or metal alloy. For example, the vehicle wheel can comprise at least one of aluminum, an aluminum alloy, titanium, a titanium alloy, magnesium, a magnesium alloy, iron, and an iron alloy.

In various non-limiting embodiments, the vehicle wheels according to the present disclosure can each be at least one of a bonded wheel, a welded wheel, a formed wheel (e.g., vacuum formed), a cured wheel, a cast wheel, a forged wheel, and an additively manufactured wheel. The vehicle wheels according to the present disclosure may have been subjected to further processing to provide the final vehicle wheel.

In various non-limiting embodiments, the load rating of the vehicle wheels according to the present disclosure can each be at least 1,000 pounds (lbs.), such as, for example, at least 5,000 lbs., at least 10,000 lbs., or at least 15,000 lbs. In various non-limiting embodiments, the load rating of the vehicle wheels according to the present disclosure can each be no greater than 20,000 lbs., such as, for example, no greater than 15,000 lbs., no greater than 10,000 lbs., or no greater than 5,000 lbs. In various non-limiting embodiments, the load rating of the vehicle wheels according to the present disclosure can each be 1,000 lbs. to 20,000 lbs., such as, for example, 5,000 lbs. to 15,000 lbs., or 9,000 lbs. to 13,000 lbs.

A method for using the vehicle wheel according to the present disclosure is provided. The method comprises mounting the vehicle wheel according to the present disclosure on a steer axle of a vehicle, a drive axle of a vehicle, or a trailer axle of a trailer. The vehicle can comprise a vehicle weight class in a range of 1 to 8, such as, for example, 3 to 8, as defined by the U.S. Federal Highway Administration.

For example, in various non-limiting embodiments the gross weight of the vehicle can be at least 10,001 lbs. The vehicle can be a light-duty, medium-duty, or heavy-duty vehicle, such as, for example, a medium-duty or heavy-duty vehicle. In various non-limiting embodiments, the vehicle can be a truck (e.g., pick-up, full-sized, tractor (e.g., semi-truck)), a van, or a bus. The vehicle can comprise at least two axles, such as, for example, at least three axles, at least four axles, at least five axles, or at least six axles. In various non-limiting embodiments, the vehicle can comprise no greater than ten axles such as, for example, no greater than six axles, no greater than five axles, no greater than four axles, or no greater than three axles. In various non-limiting embodiments, the vehicle can comprise a quantity of axles in a range of two to ten.

The trailer can comprise a single axle or at least two axles, such as, for example, at least three axles, at least four axles, at least five axles, or at least six axles. In various non-limiting embodiments, the trailer can comprise no greater than ten axles such as, for example, no greater than six axles, no greater than five axles, no greater than four axles, or no greater than three axles. In various non-limiting embodiments, the trailer can comprise one to ten axles.

Figure 2:
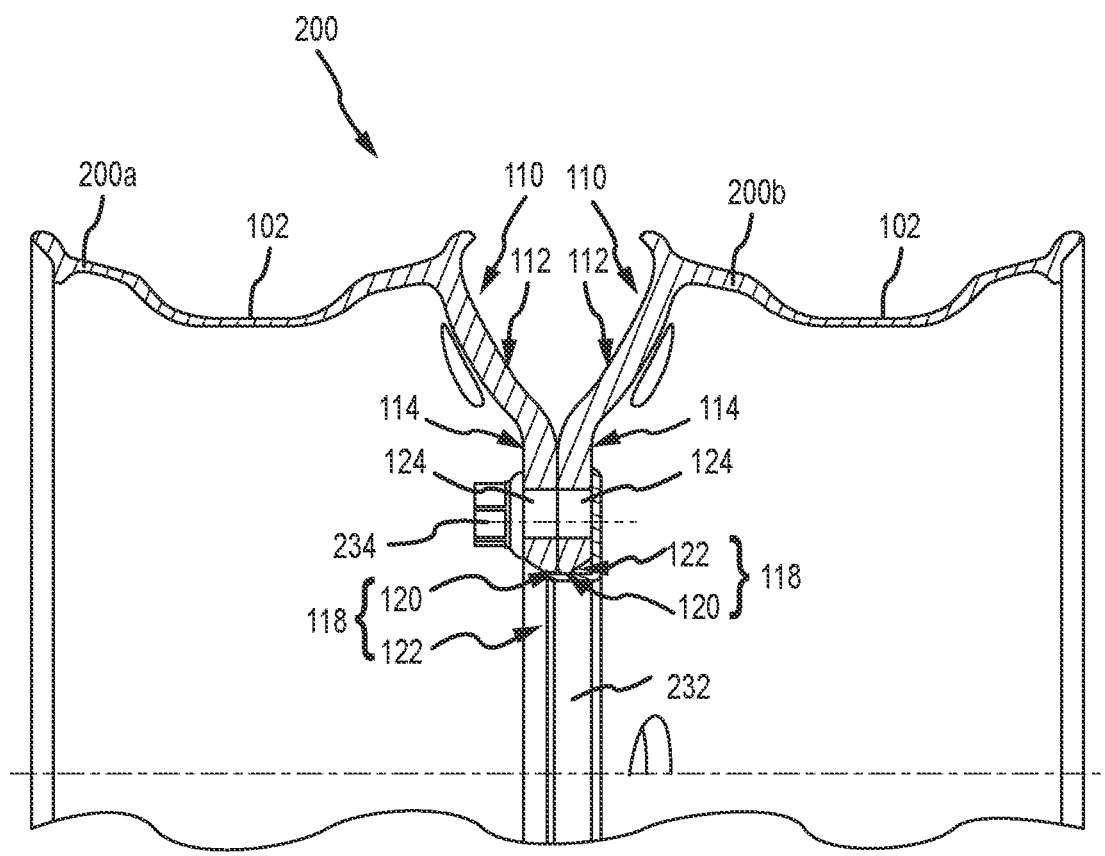
FIG. 2 is a cross-sectional detail view of a portion of a dual wheel assembly according to the present disclosure.

Referring to FIG. 2, a dual wheel assembly 200 is provided. The dual wheel assembly 200 comprises two vehicles wheels including a first vehicle wheel 200a and a second vehicle wheel 200b. Each vehicle wheel 200a, 200b, can be configured as vehicle wheel 100. A first surface 112 of the first vehicle wheel 200a can be disposed adjacent to a first surface 112 of the second vehicle wheel 200b. A central axis of the opening 116 of the first vehicle wheel 200a can be coaxial with a central axis of the opening 116 of the second vehicle wheel 200b. Additionally, the bores 124 of each respective vehicle wheels 200a, 200b can be aligned with each other to form bore pairs (e.g., one bore of the first vehicle wheel 200a aligned with one bore of the second vehicle wheel 200b).

Thereafter, the aligned openings 116 can at least partially receive the hub 232 of a vehicle axle. A stud of the hub 232 can extend through a bore pair of the dual wheel assembly 200. A flanged nut 234 can be secured on the stud of the hub 232 in order to secure the dual wheel assembly 200 to the hub 232. The flanged portion of the flanged nut 234 can be seated on the second surface 114 of the first vehicle wheel 200a such that the flanged portion does not overhang the end of the relief portion 122 of the first vehicle wheel 200a.

The relief portions 122 of the first and second vehicle wheels, 200a, 200b, can be sized such that when the dual wheel assembly 200 is installed, the pilot tab of the hub 232 can engage the generally flat portions 120 of the first and second vehicle wheels, 200a, 200b. In various non-limiting embodiments, the pilot tab of the hub 232 may not extend beyond the generally flat portion 120 of the first vehicle wheel 200a.

Referring to FIG. 3, a dual wheel assembly 300 is provided. The dual wheel assembly 300 comprises two vehicles wheels including a first vehicle wheel 300a and a second vehicle wheel 300b. Each vehicle wheel 300a, 300b, can comprise a relief portion that comprises a first relief segment 322a and a second relief segment 322b. For each vehicle wheel 300a, 300b, the first relief segment 322a can be adjacent to the first surface 112 of the second region 110 and the second relief segment 322b can be adjacent to the second surface 114 of the second region 110. The generally flat portion 120 of each vehicle wheel 300a, 300b, can be intermediate the first relief segment 322a and the second relief segment 322b. The first relief segment 322a can comprise the same shape as the second relief segment 322b or a different shape.

Regardless of the shape of the first and second relief segments 322a, 322b, for each wheel, 300a, 300b, the distance, $t_2$, can be the sum of a distance the first relief segment 322a extends along the hub surface 118 and a distance the second relief segment 322b extends along the hub surface 118. The first and second relief segments 322a, 322b of the first and second vehicle wheels, 300a, 300b, can be sized such that when the dual wheel assembly 300 is installed, the pilot tab of the hub 232 can engage the generally flat portions 120 of the first and second vehicle wheels, 300a, 300b.

Referring to FIG. 4, a dual wheel assembly 400 is provided. The dual wheel assembly 400 comprises two vehicles wheels including a first vehicle wheel 400a and a second vehicle wheel 400b. Each vehicle wheel 400a, 400b, can comprise a relief portion that comprises a first relief segment 422a and a second relief segment 422b. For each vehicle wheel 400a, 400b, the first relief segment 422a can be adjacent to the first surface 112 of the second region 110 and the second relief segment 422b can be adjacent to the second surface 114 of the second region 110. The generally flat portion 120 of each vehicle wheel 400a, 400b, can be intermediate the first relief segment 422a and the second relief segment 422b. The first relief segment 422a can comprise a different shape than the first relief segment 322a of FIG. 3 and the second relief segment 422b can comprise a different shape than the second relief segment 322b of FIG. 3 as noted by focus areas III in FIG. 3 and IV in FIG. 4.

Figure 5:
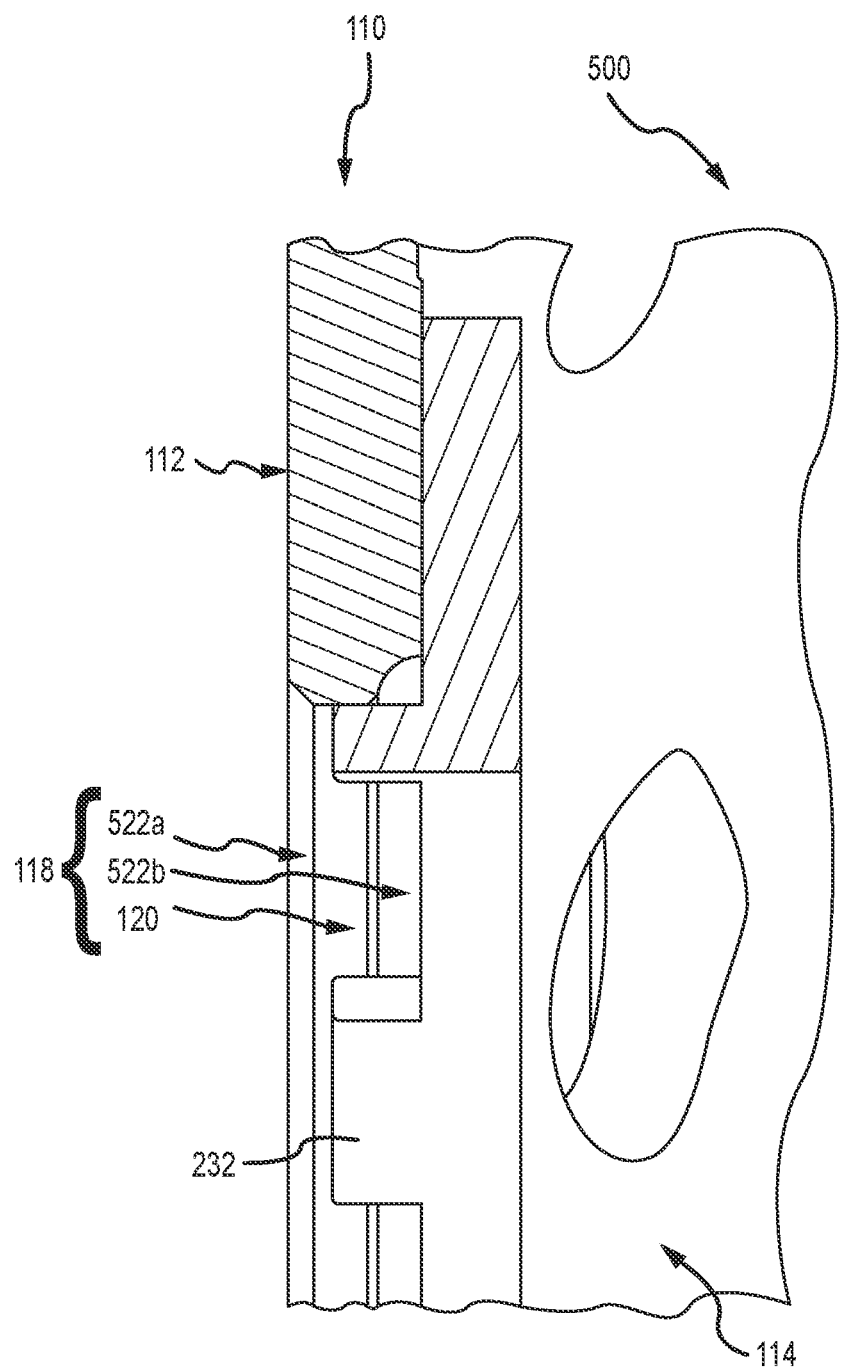
FIG. 5 is a cross-sectional detail view of a portion of a vehicle wheel according to the present disclosure.

Referring to FIG. 5, a vehicle wheel 500 is provided. The vehicle wheel 500 can comprise a relief portion that comprises a first relief segment 522a and a second relief segment 522b. The first and second relief segments 522a and 522b can be the same as each other or they can be different from each other. For example, as illustrated, the first relief segment 522a can comprise a chamfer and the relief segment 522b can comprise a fillet. In various non-limiting embodiments, the first relief segment 522a can comprise a fillet (not shown) and the second relief segment 522b can comprise a chamfer (not shown). In various other non-limiting embodiments, the first and second relief segments 522a and 522b can both comprise a chamfer (not shown) or a fillet (not shown). The first relief segment 522a can be adjacent to the first surface 112 of the second region 110 and the second relief segment 522b can be adjacent to the second surface 114 of the second region 110. The generally flat portion 120 of the vehicle wheel 500 can be intermediate the first relief segment 522a and the second relief segment 522b.

A method of producing a vehicle wheel according to the present disclosure also is provided. The method comprises bonding, welding, forming, curing, forging, casting, and/or additively manufacturing at least one of a metal and a metal alloy to provide a vehicle wheel according to the present disclosure. In various non-limiting embodiments, the method of making the vehicle wheel comprises steps in addition to the bonding, welding, forming, curing, casting, forging, or additive manufacturing. For example, the relief portion of the vehicle wheel can be formed utilizing a lathe. Creating the relief portion with a geometry suitable to be formed on a lathe can enable rapid manufacture of the vehicle wheel.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A vehicle wheel comprising:
a generally cylindrical first region comprising an outer surface and an inner surface;
a second region extending radially inwardly from the first region, the second region configured to mount to a vehicle axle, the second region comprising:
a first surface;
a second surface, a distance from the first surface to the second surface defining a thickness;
an opening extending from the first surface to the second surface and configured to receive at least a portion of a hub of the vehicle axle; and
a hub surface adjacent to and surrounding the opening and extending from the first surface to the second surface, the hub surface comprising a first portion and a relief portion abutting to at least one of the first surface and the second surface, wherein the relief portion surrounds the opening and extends along the hub surface for a distance of at least 25% of the thickness, wherein the first portion is configured to engage the hub of the vehicle axle.

2. The vehicle wheel of claim 1, wherein the relief portion extends along the hub surface for at least 50% of the thickness.

3. The vehicle wheel of claim 1, wherein the relief portion comprises at least one of a fillet and a chamfer.

4. The vehicle wheel of claim 1, wherein the relief portion comprises a fillet comprising a radius in a range of 0.1 inches to 10 inches, inclusive.

5. The vehicle wheel of claim 1, wherein the relief portion comprises a chamfer comprising a chamfer length in a range of 0.1 inch to 5 inches, inclusive.

6. The vehicle wheel of claim 1, wherein the thickness is in a range of 0.1 inches to 5 inches, inclusive.

7. The vehicle wheel of claim 1, wherein the second region comprises at least two bores extending from the first surface to the second surface, each of the at least two bores configured to receive a stud of the hub of the vehicle axle, wherein the relief portion comprises an end adjacent to the at least one of the first surface and the second surface, and wherein the end is disposed at least 0.1 inches from each of the at least two bores.

8. The vehicle wheel of claim 1, wherein the relief portion comprises a first relief segment abutting the first surface and a second relief segment abutting the second surface.

9. The vehicle wheel of claim 1, wherein the first region comprises a nominal rim diameter in a range of 1 inch to 200 inches, inclusive, and a nominal rim width in a range of 1 inch to 100 inches, inclusive.

10. The vehicle wheel of claim 1, wherein the first region comprises a nominal rim diameter in a range of 14 inches to 25 inches, inclusive, and a nominal rim width in a range of 6 inches to 24 inches, inclusive.

11. The vehicle wheel of claim 1, wherein vehicle wheel comprises at least one of a metal and a metal alloy.

12. A dual wheel assembly comprising:
a first vehicle wheel and a second vehicle wheel, each of the first vehicle wheel and the second vehicle wheel comprising:
a generally cylindrical first region comprising an outer surface and an inner surface;
a second region extending radially inwardly from the first region, the second region configured to mount to a vehicle axle, the second region comprising:
a first surface;
a second surface, a distance from the first surface to the second surface defining a thickness;
an opening extending from the first surface to the second surface and configured to receive at least a portion of a hub of the vehicle axle; and
a hub surface adjacent to and surrounding the opening and extending from the first surface to the second surface, the hub surface comprising a first portion and a relief portion abutting the second surface, wherein the relief portion surrounds the opening and extends along the hub surface for a distance of at least 25% of the thickness, and wherein the first portion is configured to engage the hub of the vehicle axle;
wherein the first surface of the first vehicle wheel is adjacent to the first surface of the second vehicle wheel, and a central axis of the opening of the first vehicle wheel and a central axis of the opening of the second vehicle wheel are coaxial.

13. The dual wheel assembly of claim 12, wherein each relief portion extends along the hub surface for at least 50% of the thickness.

14. The dual wheel assembly of claim 12, wherein each relief portion comprises at least one of a fillet and a chamfer.

15. The dual wheel assembly of claim 12, wherein each thickness is in a range of 0.1 inches to 5 inches, inclusive.

16. The dual wheel assembly of claim 12, wherein each second region comprises at least two bores extending therethrough, each of the at least two bores configured to receive a stud of the hub of the vehicle axle, wherein each relief portion comprises an end adjacent to the respective second surface, and wherein each end is disposed at least 0.1 inches from each of the at least two bores.

17. The dual wheel assembly of claim 12, wherein the first region comprises a nominal rim diameter in a range of 1 inch to 200 inches, inclusive, and a nominal rim width in a range of 1 inch to 100 inches, inclusive.

18. A method of producing a vehicle wheel, the method comprising:
providing a vehicle wheel by a method comprising at least one of forming, curing, forging, casting, and additive manufacturing, the vehicle wheel comprising at least one of metal and a metal alloy, the vehicle wheel including
a generally cylindrical first region comprising an outer surface and an inner surface;
a second region extending radially inwardly from the first region, the second region configured to mount to a vehicle axle, the second region comprising:
a first surface;
a second surface, a distance from the first surface to the second surface defining a thickness;
an opening extending from the first surface to the second surface and configured to receive at least a portion of a hub of the vehicle axle; and
a hub surface adjacent to and surrounding the opening and extending from the first surface to the second surface, the hub surface comprising a first portion and a relief portion abutting at least one of the first surface and the second surface, wherein the relief portion surrounds the opening and extends along the hub surface for a distance of at least 25% of the thickness, wherein the first portion is configured to engage the hub of the vehicle axle.

19. The method of claim 18, wherein the relief portion comprises at least one of a fillet and a chamfer.

20. The method of claim 18, further comprising forming the relief portion utilizing a lathe.

* * * * *